US006965951B2

(12) United States Patent
Kim

(10) Patent No.: US 6,965,951 B2
(45) Date of Patent: Nov. 15, 2005

(54) DEVICE CENTRIC DISCOVERY AND CONFIGURATION FOR FABRIC DEVICES

(75) Inventor: Hyon T. Kim, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 374 days.

(21) Appl. No.: 10/147,591

(22) Filed: May 17, 2002

(65) Prior Publication Data

US 2003/0217212 A1 Nov. 20, 2003

(51) Int. Cl.[7] .......................... G06F 3/00; G06F 15/177
(52) U.S. Cl. ........................................ 710/19; 709/220
(58) Field of Search ............................ 710/17–19, 104; 709/220, 221, 222, 223, 224

(56) References Cited

U.S. PATENT DOCUMENTS

| | | | |
|---|---|---|---|
| 5,600,791 A | 2/1997 | Carlson et al. | |
| 5,805,924 A | 9/1998 | Stoevhase | |
| 5,872,932 A | 2/1999 | Schettler et al. | |
| 5,941,972 A | 8/1999 | Hoese et al. | |
| 5,944,798 A | 8/1999 | McCarty et al. | |
| 5,959,994 A | 9/1999 | Boggs et al. | |
| 5,974,546 A | 10/1999 | Anderson | |
| 6,009,466 A | * 12/1999 | Axberg et al. | 709/220 |
| 6,016,144 A | 1/2000 | Blonstein et al. | |
| 6,182,167 B1 | 1/2001 | Basham et al. | |
| 6,199,112 B1 | 3/2001 | Wilson | |
| 6,229,540 B1 | 5/2001 | Tonelli et al. | |
| 6,304,549 B1 | 10/2001 | Srinivasan et al. | |
| 6,344,862 B1 | 2/2002 | Williams et al. | |
| 6,393,489 B1 | 5/2002 | Sambamurthy et al. | |
| 6,446,141 B1 | 9/2002 | Nolan et al. | |
| 6,449,734 B1 | 9/2002 | Shrivastava et al. | |
| 6,473,405 B2 | 10/2002 | Ricciulli | |
| 6,538,669 B1 | 3/2003 | Lagueux, Jr. et al. | |
| 6,584,499 B1 | 6/2003 | Jantz et al. | |
| 6,594,698 B1 | 7/2003 | Chow et al. | |
| 6,633,538 B1 | 10/2003 | Tanaka et al. | |
| 6,640,278 B1 | 10/2003 | Nolan | |
| 6,643,748 B1 | 11/2003 | Wieland | |
| 6,654,752 B2 | 11/2003 | Ofek | |
| 6,665,714 B1 | 12/2003 | Blumenau et al. | |

(Continued)

FOREIGN PATENT DOCUMENTS

| | | |
|---|---|---|
| EP | 989 490 | 3/2000 |
| EP | 1 085 414 | 3/2001 |
| WO | 98/18306 | 5/1998 |
| WO | 01/14987 | 3/2001 |

OTHER PUBLICATIONS

Khattar, et al., "Introduction to Storage Area Network, SAN," IBM, SG24–5470–00, International Technical Support Organization, Aug. 1999, 54 pages.

(Continued)

*Primary Examiner*—Khanh Dang
(74) *Attorney, Agent, or Firm*—Robert C. Kowert; Meyertons, Hood, Kivlin, Kowert & Goetzel, P.C.

(57) ABSTRACT

A host may be coupled to a fabric network. Fabric devices attached to the fabric network may be visible to the host through one or more host adapter ports. The host system may include a device centric discovery interface configured to provide an interface to a fabric driver to obtain information about the devices in the fabric network. The device centric discovery interface may be configured to return device centric discovery information such that a multi-path fabric device is presented as a single device with transport information provided for each path to the multi-path device. A device centric configuration interface may provide an interface to the fabric driver for device centric configuration of the devices in the fabric for use by the host such that a requested fabric device is configured for use by the host on multiple paths in the fabric network.

22 Claims, 10 Drawing Sheets

U.S. PATENT DOCUMENTS

| | | |
|---|---|---|
| 6,683,605 B1 | 1/2004 | Bi et al. |
| 6,694,361 B1 | 2/2004 | Shah et al. |
| 6,728,789 B2 | 4/2004 | Odenwald et al. |
| 6,748,459 B1 | 6/2004 | Lin et al. |
| 6,792,479 B2 | 9/2004 | Allen et al. |
| 2001/0047482 A1 | 11/2001 | Harris et al. |

OTHER PUBLICATIONS

"Open SANs, An In–Dept Brief,"Version 1.1, Dec. 2000, 10 pages.

American National Standards Institute *for Information Technology* "Fibre Channel—General Services—3 (FC–GS–3)," ANSI NCITS 348–2001, 2001 Information Technology Industry Council, 261 pages.

American National Standards Institute *for Information Technology* "Fibre Channel—Switch Fabric (FC–SW)," ANSI NCITS 321–1998, 1998 Information Technology Industry Council, 108 pages.

American National Standards Institute *for Information Technology* "Fibre Channel Arbitrated Loop (FC–AL–2)," ANSI NCITS 332–1999, 1999 Information Technology Industry Council, 149 pages.

American National Standards Institute *for Information Technology* "Fibre Channel—Arbitrated Loop (FC–AL)," ANSI X3.272–1996, 1996 Information Technology Industry Council, 102 pages.

American National Standards Institute *for Information Technology* "Fibre Channel—Fabric Generic Requirements (FC–FG)," ANSI X3.289–1996, 1997 Information Technology Industry Council, 33 pages.

* cited by examiner

US 6,965,951 B2

DEVICE CENTRIC DISCOVERY AND CONFIGURATION FOR FABRIC DEVICES

BACKGROUND OF THE INVENTION

1. Field of the Invention

This invention relates to network systems, and more particularly to discovery and configuration of devices attached to a fabric in a storage network.

2. Description of the Related Art

Storage area networks, also referred to as SANs, are dedicated networks that connect one or more systems to storage devices and subsystems. Today, fibre channel is one of the leading technologies for SANs. In general, fibre channel encompasses three networking topologies: point-to-point, loop, and fabric. In a point-to-point topology, a fibre channel host adapter in a system is typically connected to a single fibre channel storage subsystem. In a fibre channel loop network, also called an arbitrated loop, the loop is constructed by connecting devices together in a single logical ring. Loops can be constructed by connecting devices through a fibre channel hub in a star-wired topology or by connecting them together in a connected physical loop from device to device. In a fibre channel fabric topology, the storage networks are constructed with network switches. A fabric can be composed of a single switch or multiple switches. Ports on fabric networks connect devices to switches on low-latency, point-to-point connections.

The devices connected in the loop and fabric topologies may be referred to as "network nodes" and may be any entity that is able to send or receive transmissions in a fibre channel network. For example, a network node may be a computer system, a storage device/subsystem, a storage router/bridge that connects SCSI equipment, a printer, a scanner, or any other equipment, such as data capture equipment. The ANSI X3.272-1996 specification entitled "FC-AL, Fibre Channel Arbitrated Loop" and the ANSI X3.T11 Project 1133-D specification entitled "FC-AL-2, Fibre Channel Arbitrated Loop" describe examples of fibre channel loop topologies in further detail. The ANSI X3.T11 Project 959-D specification entitled "FC-SW Fibre Channel Switch Fabric" describes an example of a fibre channel fabric in further detail. Note that the most recent versions of these and related specifications may be obtained from the T11 technical committee of the National Committee for Information Technology Standards (NCITS).

For point-to-point topologies and loop topologies, device drivers executing on a host computer may perform device discovery at host boot-up to determine locally connected devices. The discovered devices are configured to be accessible to applications running on the host by creating a node for each device within the host. These types of nodes are referred to as operating system device nodes. Each node functions as an internal (to the host) representation of an attached device and provides a communication path to the device. For fabric topologies, discovering fabric devices and associated paths available to the host computer as part of the boot-up process may not be feasible because of the number of devices capable of being attached to the fabric. In addition, there may be multiple paths from a host computer to a particular device in the fabric.

SUMMARY OF THE INVENTION

A host system may have one or more host adapter ports for coupling the system to a fabric network. Fabric devices attached to the fabric network may be visible to the system through the one or more host adapter port. The host system may include a fabric driver configured to interface the system to the fabric network through the host adapter ports. A device centric discovery interface may provide an interface to the fabric driver to obtain information about the devices in the fabric network. The device centric discovery interface may return device centric discovery information such that a multi-path fabric device is presented as a single device with transport information provided for each path to the multi-path device. A single device may be an upper level protocol ULP device, such as a SCSI LUN device wherein a number of ULP devices may share the same fabric transport path. The system may also include a device centric configuration interface for providing an interface to the fabric driver for device centric configuration of the devices (including multi-path devices) in the fabric for use by the host system such that a requested fabric device is configured for use by the host system on multiple paths in the fabric network.

The host system may also include a transport centric discovery interface configured to provide an interface to the fabric driver to obtain information about the devices in the fabric network. The transport centric discovery interface may return transport centric discovery information such that a multi-path device is presented as a separate device for each path to the multi-path device. The host system may also include a transport centric configuration interface for providing an interface to the fabric driver for transport centric configuration of the devices in the fabric for use by the system such that fabric device are configured for use by the system on a requested fabric transport path.

A method may include discovering a plurality of devices on a fabric network and displaying information describing the plurality of discovered devices in a device-centric format, wherein in the device-centric format each device is displayed as a single device with one or more associated paths each corresponding to a particular transport connection to a host. A displayed device may be an upper level protocol device, such as a SCSI LUN device. The method may include configuring a selected one of the devices for use by the host on one or more associated paths in response to user input.

While the invention is described herein by way of example for several embodiments and illustrative drawings, those skilled in the art will recognize the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Figure 1:
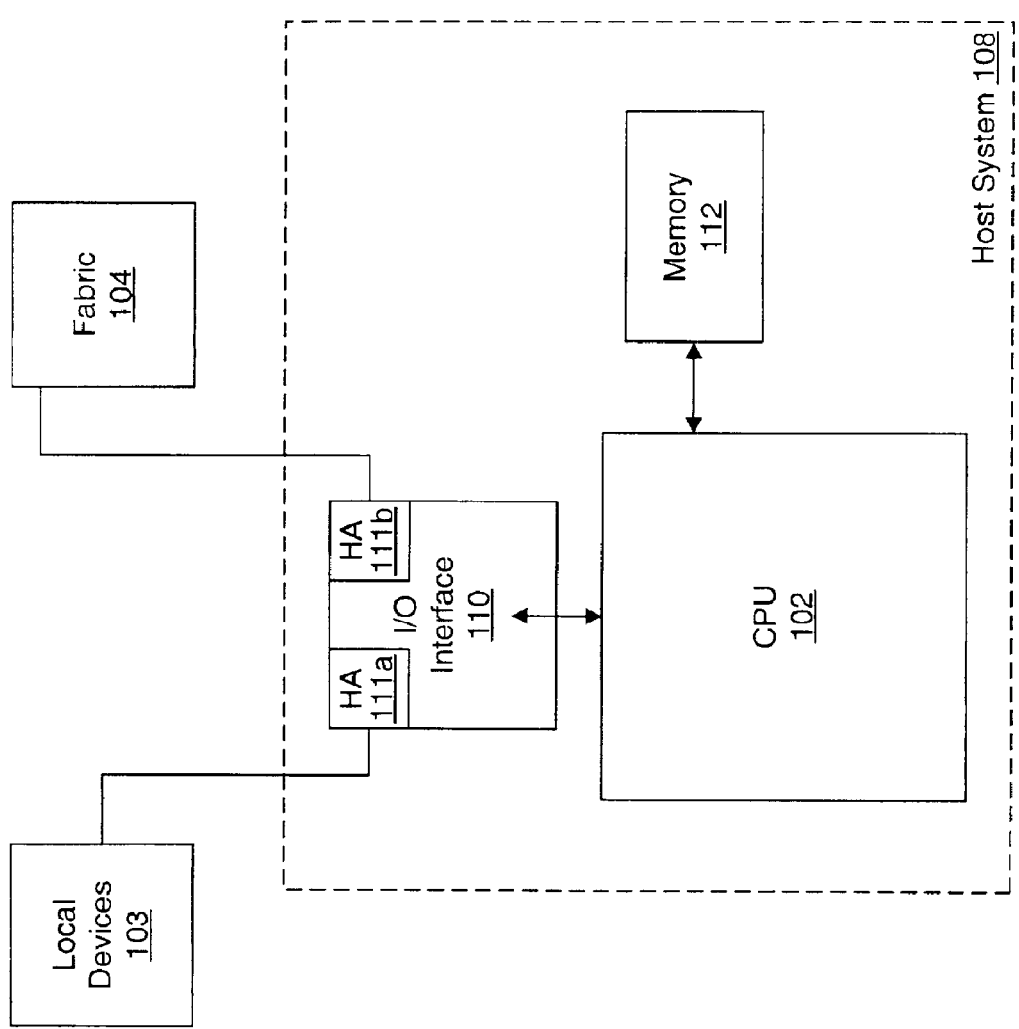
FIG. 1 illustrates a host computer attached to a fabric and one or more local devices.

Suitable for implementing various embodiments, FIG. 1 illustrates a host system 108 attached to a fabric 104. The host system may include at least one central processing unit (CPU) or processor 102. The CPU 102 may be coupled to a memory 112. The memory 112 is representative of various types of possible memory media, also referred to as "computer readable media". Hard disk storage, floppy disk storage, removable disk storage, flash memory or random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution.

The memory 112 may permit two-way access: readable and writable. The memory 112 may store instructions and/or data which implement all or part of the system and method described in detail herein, and the memory 112 may be utilized to install the instructions and/or data. The host system 108 may be any of the various types of devices, including, but not limited to, a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" may be broadly defined to encompass any device having a processor 102 which executes instructions from a memory medium.

The host system 108 may be coupled to a fabric 104, which may provide access to a plurality of fabric attached devices, such as persistent storage devices or other computer peripheral devices. The CPU 102 may acquire instructions and/or data through an input/output (I/O) interface 110. Through the input/output interface 110, the CPU 102 may also be coupled to one or more local devices 103, such as local input/output devices (video monitors or other displays, track balls, mice, keyboards, etc.) local storage devices (hard drives, optical storage devices, etc.), local printers, plotters, scanners, and any other type of local I/O devices for use with a host system 108. Some local devices 103 may be referred to as direct attach devices. The input/output interface 110 may include host adapters (HA) 111a and 111b for coupling to the local devices 103 and fabric respectively. Host adapters 111a and 111b may be fibre channel adapters (FCAs). In one embodiment, one or more of the local devices 103 may be included in the host system 108, such as in expansion slots of the host system 108. In one embodiment, one or more of the local devices 103 may be externally connected to the host system 108.

The host system 108 may be able to execute one or more computer programs. The computer programs may comprise an operating system (OS) or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. In one embodiment, the OS may be based on the Solaris™ operating system from Sun Microsystems, Inc. The computer programs may be stored in a memory medium or storage medium such as the memory 112. Alternatively, the computer programs may be provided to the CPU 102 through the fabric or input/output interface 110.

Figure 2:
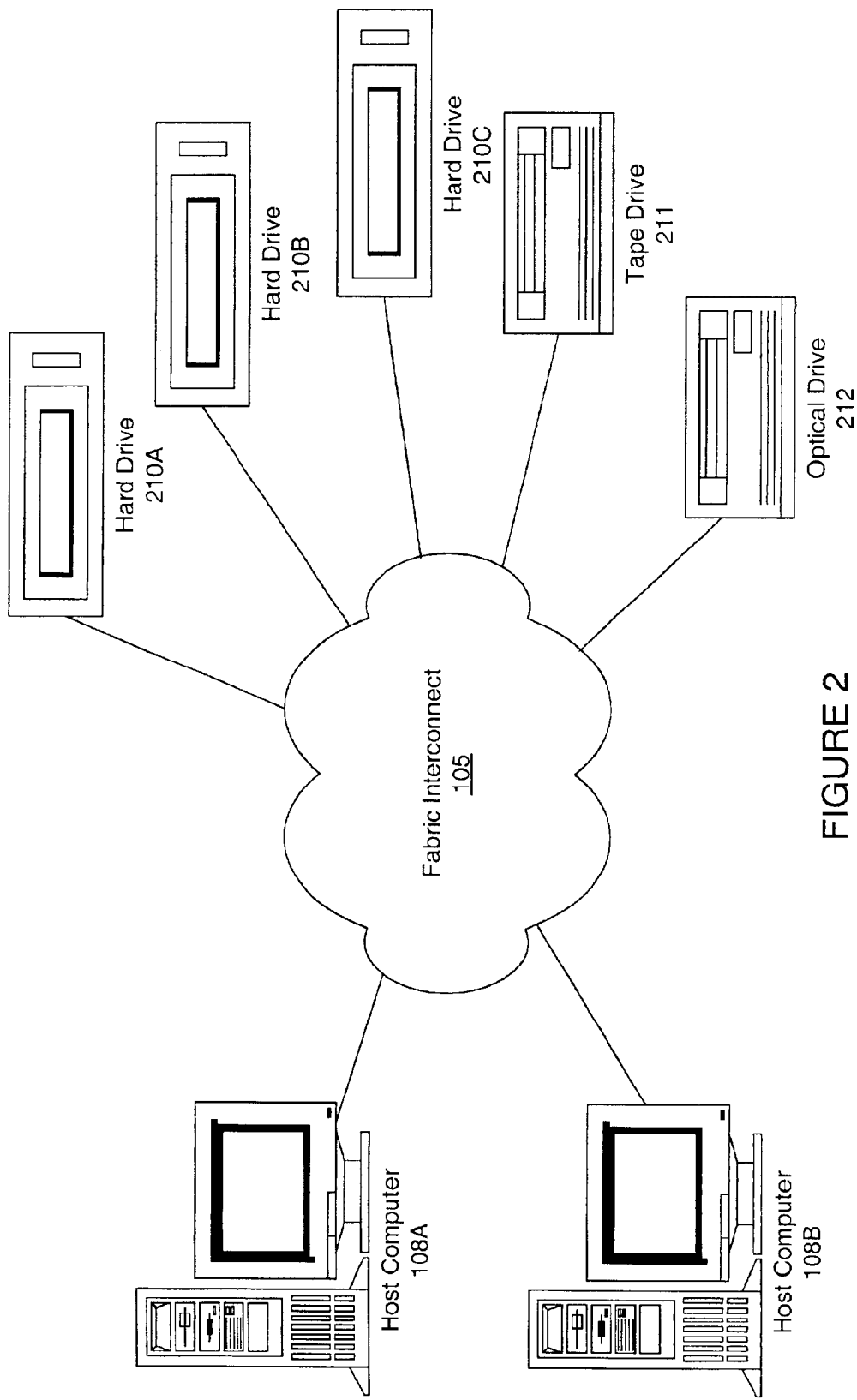
FIG. 2 illustrates an example of a storage area network (SAN) suitable for implementing various embodiments.

FIG. 2 illustrates an example of a storage area network (SAN) coupled to host computers 108A and 108B. The SAN includes a fabric interconnect 105 coupled to hard drives 210A, 210B, and 210C, tape drive 211, and optical drive 212. Hard drives 210A, 210B, and 210C, tape drive 211, and optical drive 212 may also be referred to as fabric devices. Each device may be coupled to one or more host computer through the fabric interconnect. A device may have multiple paths through the fabric to the same host or host adapter port. Also, several upper layer protocol (ULP) devices may share the same connection to the fabric. For example, hard drive 210A may be a drive array or JBOD including multiple hard drives or logical units coupled to the fabric through the same fabric connection. Note that the number and types of hosts and devices are for illustration purposes only, and the actual number and types of hosts and/or devices in a SAN may vary.

Figure 3:
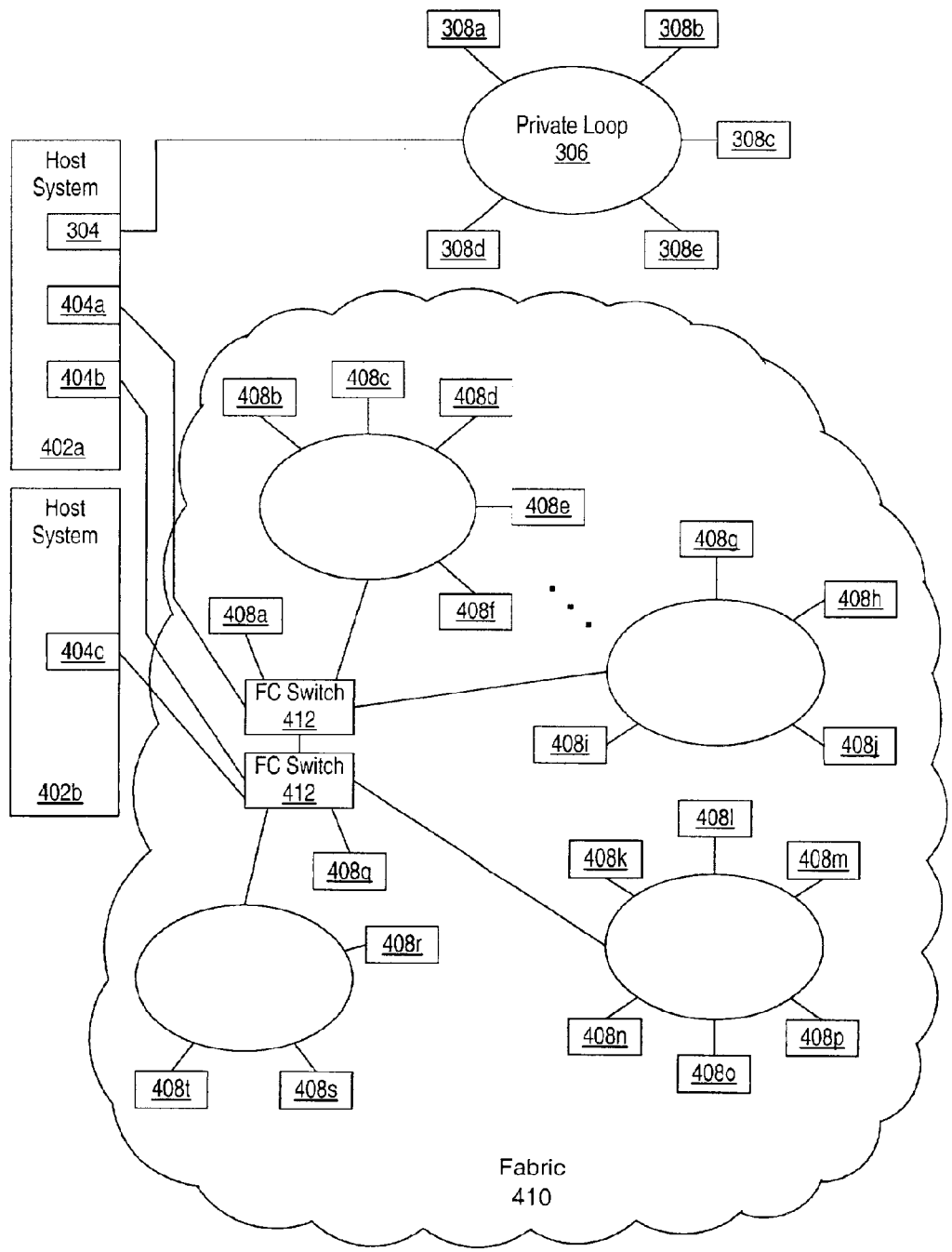
FIG. 3 is an example of a storage network suitable for implementing various embodiments.

FIG. 3 illustrates a more detailed example of a storage network which includes a direct attached private loop 306 and a fabric 410. Note that storage networks may be configured in a variety of different ways and many include one or more direct attach devices, SANs, and/or network attach (NAS) devices. Furthermore, note that fabrics and/or SANs are not limited to fibre channel technologies and architectures but may include various types of technologies. For example, some or all of a SAN may be based on the InfiniBand™ architecture or Small Computer System Interface over IP (iSCSI).

Host adapter 304 couples host system 402a to private loop 306 and adapters 404a and 404b couple host system 402b to fabric 410. Note that host adapters 304, 404a and 404b may be separate host bus adapter cards, for example. In other embodiments, host adapters 304, 404a and 404b may each refer to a separate host adapter port. Coupled to private loop 306 are one or more direct attach devices 308. Direct attach device(s) are considered local to host system 402A.

The host system 402b may be coupled to fabric 410 via host adapter 404c. Fabric 410 may include fibre channel switches 412 which are coupled to multiple fabric devices 408. Each fibre channel switch 412 may connect to various fibre channel topologies such as point-to-point fibre channel connections or fibre channel loops. Each switch 412 may also connect to one or more other fibre channel switches. The fabric devices 408 may be various storage devices such as hard disk drives, optical drives, tape drives, etc. In some embodiments, fabric devices 408 may be any type of I/O device such as storage devices, printers, scanners, etc. as used in conjunction with computer systems.

Due to the large number of devices which may be present in fabric 410, the time required for a host system 402 to discover and online all of the devices available through fabric 410 may be impractical. Furthermore, it may be unlikely that host system 402 actually needs to communicate with all of the various fabric devices 408. The term "online" may be used herein to refer to a host creating a node as a representation in the host of a device and/or a communication mechanism or path to a device.

Within fabric 410, a host or host adapter port may have multiple paths through the fabric to the same device. For example, FIG. 3 shows host system 402a having at least two paths to device 408a. One path is from 408a to switch 412a to host system 402a. Another path is from device 408a to switch 412a to switch 412b to host system 402a. In some embodiments, the same host adapter port may be able to reach a fabric device through several at least partially different paths within the fabric. In some embodiments, fabric 410 may include numerous switches and interconnect such that a host may have multiple paths to any number of devices within the fabric. Multiple paths may provide for redundancy in a host system's ability to communicate with a device.

Figure 4:
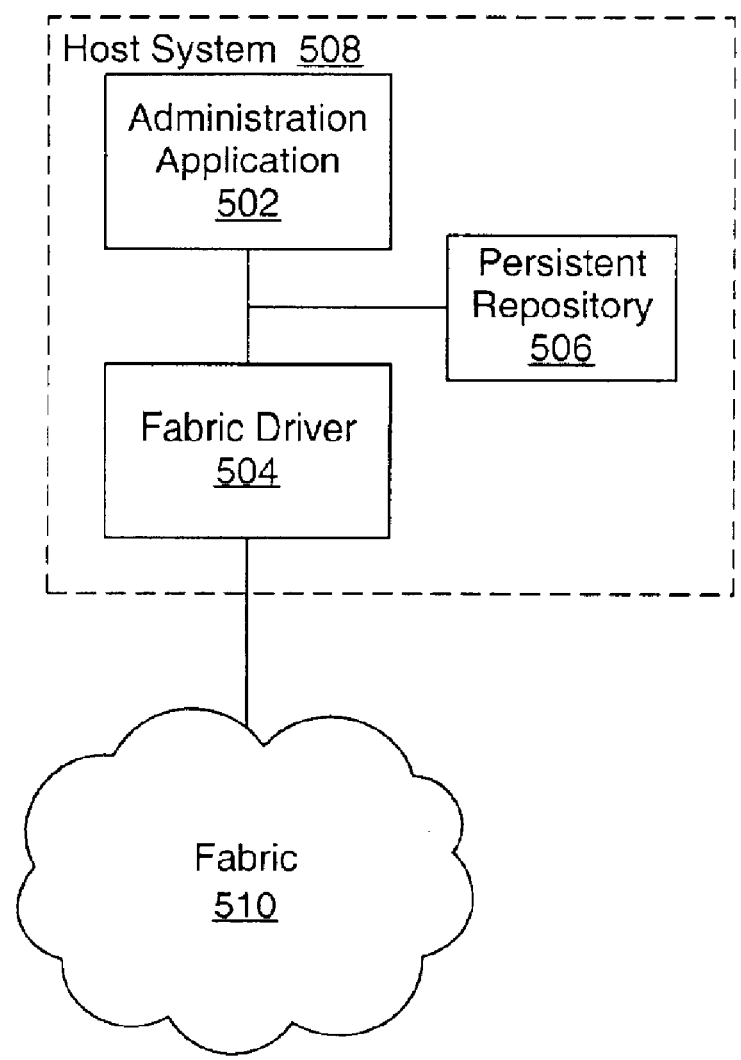
FIG. 4 is an illustration of a host computer coupled to a fabric according to one embodiment.

FIG. 4 illustrates a host system 508 coupled to a fabric 510 according to one embodiment. The fabric may be implemented with one or more switches coupled to one or more storage devices or subsystems. Furthermore, the fabric may not be limited to fibre channel fabrics but may be extended to any type of switched storage network. A fabric driver 504 may provide an interface between the host system 508 and fabric 510. A persistent repository 506 may be a data structure that stores information on the current configuration of the fabric devices. An administration application 502 may be a software program running on the host system 508 and accessible to a user (e.g., system administrator, other process, etc.). Administration application 502 may provide a mechanism for discovering fabric devices on-demand with user input thereby eliminating the need to discover all fabric devices accessible to a host system 508 at one time. As such, nodes may be created only for selected fabric devices (e.g., a subset of available fabric devices) during a discovery process. If a node is already created for a selected fabric device, it may not be necessary to re-create the node.

During a discovery process, the administration application 502 may query a fabric driver 504 for a list of devices visible to the host system 508. In some embodiments, the query operations made by the administration application to obtain a list of the fabric devices may be made on a per host adapter port granularity or a set of host adapter ports granularity so that the number of devices returned by the query may be more manageable.

The fabric driver 504 may provide an interface for the host system 508 to the fabric 510. The fabric driver 504 may be part of the operating system for the host system 508 and may include one or more modules for handling various functions required to interface the host system 508 to the fabric 510 such as protocol handling and device and/or transport layer operations. In one embodiment, the fabric driver 504 may be a Solaris kernel module or modules. The fabric driver 504 may provide the requested list of devices to the administration application 502. A subset of these devices may then be selected through the administration application 502 and brought online by the fabric driver 504 so that the subset of devices are accessible from the host system 508. Onlining the subset of devices may include the creation of a node within the operating system for each device wherein the node provides a reference for applications or other processes in the host system 508 to reference a corresponding device in the fabric. Thus, a node may provide a reference for an application or process running on the host system 508 to communicate with one of the fabric devices. When a fabric device is onlined, a communication path may be established between the host system 508 and the discovered fabric device. A discovered fabric device may have multiple paths through the fabric to a host 508. Such a device may be referred to as a multi-path device. The host 508 may include a multi-path device manager, such as Traffic Manager from Sun Microsystems, Inc. Thus, it may be desirable to online a discovered fabric device for multiple communication paths to the host for management by a multi-path manager. The multi-path manager may provide for load balancing to devices over multiple paths in the fabric. The multi-path manager may provide for fail-over to another path in case a path to a multi-path device fails.

Figure 5:
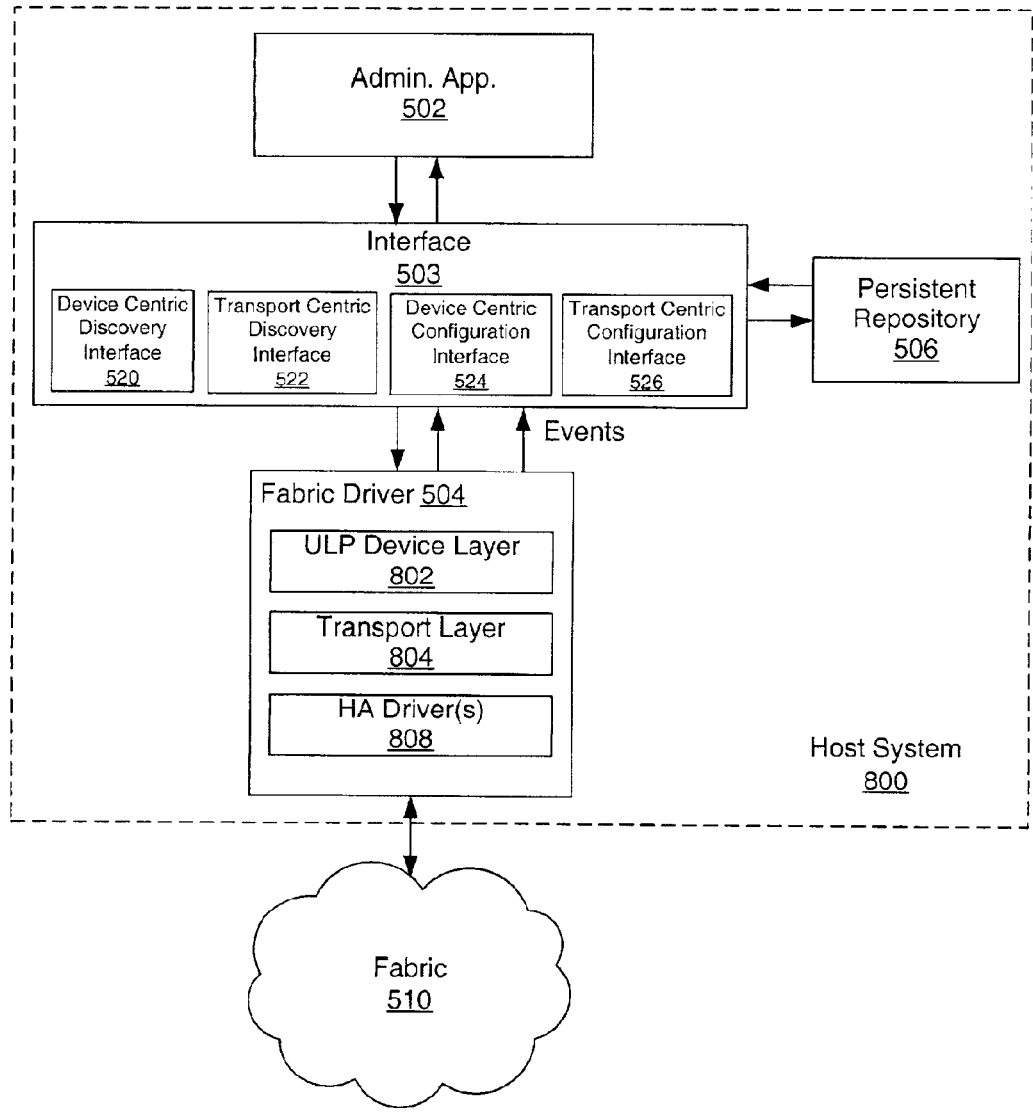
FIG. 5 is an illustration of a host computer system coupled to a fabric according to one embodiment.

FIG. 5 illustrates a host system 800 coupled to a fabric 510 according to one embodiment. The host system 800 may include a fabric driver 504 for communicating with a fabric such as a fibre channel fabric. An interface 503 may be provided as an interface between the administration application 502 and the fabric driver 504. In one embodiment, the interface 503 may be part of the operating system libraries and may be useable by other applications on the host system. In further embodiments, the interface 503 may be part of a particular application residing on the host system and useable by other applications, or implemented as part of fabric driver 504.

The interface 503 may be provided to the fabric driver 504 that includes a device centric discovery interface 520 to represent a multi-path device as a single device while showing transport information for each path to the device. The device centric discovery interface 520 may allow a user (e.g., an application) to discover information about fabric devices from a device centric perspective. The device centric discovery interface 520 may return device centric discovery information such that a multi-path device is shown as a single device with transport information shown for each path to the device. In some embodiments, several upper layer protocol (ULP) devices may share the same connection to the fabric. The device centric discovery interface 520 may provide multi-path discovery information for each ULP device. For example, a SCSI drive array may include multiple SCSI LUN (Logical Unit Number) devices from the same SCSI target in the fabric. The device centric discovery interface 520 may return discovery information from the perspective of each SCSI LUN.

The interface 503 to the fabric driver may also include a transport centric discovery interface 522 to provide fabric device discovery information from a transport perspective.

The transport centric interface 522 may return transport information according to each path. Thus, the transport centric discovery interface 522 shows each path separately, even though two or more paths may be connected to the same device.

In one embodiment, including both a device centric discovery interface 520 and a transport centric discovery interface 522, a user may discover fabric devices from a device centric perspective, a transport centric perspective, or both. For multi-path devices, the device centric discovery interface shows the device with transport information grouped together for each path to the device. Multi-path devices may be less easily identified using the transport centric discovery interface 522 since each path is shown separately and may not be grouped according to the device.

The interface 503 to the fabric driver may also include a device centric configuration interface 524 to configure multiple paths to fabric devices from a device perspective. For a particular device, the device centric configuration interface 524 may provide for configuring (e.g., onlining) multiple paths to the device. A user may desire to configure all discovered fabric connections to a certain device to take advantage of multi-path management support provided within the host. In one embodiment, for a specified device the device centric configuration interface 524 may configure each discovered path in the fabric to the specified device.

The interface 503 to the fabric driver may also include a transport centric configuration interface 526 to configure specific paths to fabric devices from a transport perspective. The transport centric configuration interface 526 may provide for configuring a specific path to a device.

Administration application 502 may provide a mechanism to select and online a subset of the visible fabric devices. The mechanism to select and online a subset of devices may utilize a device centric and/or transport centric interface to the fabric driver to discover and configure devices. In one embodiment, the administration application 502 may be run outside of the boot process so that device discovery and online operations do not increase the host system 508 boot time. The administration application 502 may be run on-demand so that fabric devices may be selected and brought online on demand. For one embodiment, a user may use the administration application 502 to request a list of fabric devices available through one or more host adapter I/O ports of the host system. The administration application 502 may include a command line interface or a graphical user interface (or both) for displaying the list to the user. Fabric device information may be requested from a device perspective, a transport perspective, or both. Through the administration application the user may then select a desired subset of the listed devices and may request that the selected devices be brought online. In one embodiment, the user may select a device from a device centric view and request that the selected device be brought online with associated multiple paths. In further embodiments, the user may select a device from a transport centric perspective and request that the selected device associated with the selected path be brought online.

For one embodiment, the fabric driver 504 may include various sub-modules. For example, in a fabric channel implementation, the fabric driver 504 may include a ULP device layer 802. ULP device module(s) in layer 802 may be part of the operating system kernel and may perform all protocol related operations required for fabric channel use on the host operating system. For example, a ULP module may be a SCSI over fiber channel encapsulation driver module for supporting SCSI over fiber channel. The fabric driver may also include a transport layer 804. This layer may include one or more modules that may perform generic fabric operations. In one embodiment, the transport layer may include a fiber channel port (FP) driver for each fibre channel port on the host system. Each FP driver may also be part of the operating system kernel. The FP driver may perform generic fiber channel operations such as topology discovery (e.g., loop, point-to-point, fabric, etc.), device discovery (on various topologies), handling extended link services, handling link state changes, etc. The fabric driver 504 may also include host adapter (HA) drivers 808 for each host adapter/controller board on the host system. For example, FCA drivers may be present for fiber channel adapters having fiber channel ports on the host system.

The interface 503 may provide application programming interfaces (APIs) for the administration application 502 to make queries in order to obtain a list of devices connected to one or more host adapter ports. Fabric device information may be returned according to a device centric perspective and/or a transport centric perspective. In one embodiment, interface 503 may interact with a device layer and/or a transport layer of the fabric driver 504 to execute the query irrespective of the interconnect topology of the host adapter ports. For example, the fabric driver 504 may obtain the list of devices connected to a fibre channel switched fabric by querying a fabric name server. The fabric name server may be located within a fabric switch or distributed across the fabric switches and may maintain information about the various fabric devices. The fabric name server may include a database of objects. Each fabric attached device may register or query useful information in the name server, including, name, address, class of service capability of other participants, etc. Fabric driver 504 may also obtain upper layer protocol (ULP) device information. The interface 503 or fabric driver 504 may also provide an API for obtaining a list of direct attach devices for a host. For example, the fabric driver 504 may obtain the loop map for a host system's private loop topology.

The following examples illustrate information that may be returned by transport centric discovery interface 522 and device centric discovery interface 520 from the transport and device layers of fabric driver 504. In the first example below, transport centric information obtained through the transport centric interface, based on a port World Wide Name (WWN), is shown. As shown below, a device which may be connected to the fabric through two host adapter ports, 50020f2300006077 and 50020f2300006107, is presented separately for each port WWN.

| Port WWN | Device Type | Capacity | Configured Info |
|---|---|---|---|
| Fabric FCA port c4 | | | |
| 50020f2300006077 | SCSI-disk | 36G | unconfigured |
| 50020f2300005f24 | SCSI-disk | 36G | configured |
| 210100e08b247c12 | IP | | configured |
| Fabric FCA port c5 | | | |
| 50020f2300006107 | SCSI-disk | 36G | unconfigured |
| 50020f23000063a9 | SCSI-disk | 36G | configured |
| 210100e08b245f12 | IP | | configured |
| Fabric FCA port c6 | | | |
| . | | | |
| . | | | |
| . | | | |

In the next example, device centric information obtained through the transport centric interface based on an Upper Layer Protocol (ULP) device identifier, is shown. As shown in the example, a device which has ULP unique ID 60020F20000063A93AEFFB5C000D6984 is connected to both c4 and c5 host adapter ports and is presented as a single ULP device. For FCP SCSI, the Global Unique ID may be used to indicate the ULP device. The multi-path (MP) support field below indicates if the fibre channel host adapter port is enabled with multi-path management support or not. The first three devices have the same FC connection since they are SCSI devices from the same SCSI target device.

| FC connection | Configured | MP support | Status |
|---|---|---|---|
| FCP SCSI ID 60020F20000063A93AEFFB5C000D6984 (SCSI Disk Device Capacity: 36G) | | | |
| c4 50020f2300006077 | no | yes | ok |
| c5 50020f2300006107 | no | yes | ok |
| FCP SCSI ID 60020F20000063A93AEFFB3000098A19 (SCSI Disk Device Capacity: 36G) | | | |
| c4 50020f2300006077 | no | yes | ok |
| c5 50020f2300006107 | no | yes | ok |
| FCP SCSI ID 60020F20000063A93AEFFB200003D112 (SCSI Disk Device Capacity: 36G) | | | |
| c4 50020f2300006077 | no | yes | ok |
| c5 50020f2300006107 | no | yes | ok |
| FCP SCSI ID 60020F20000063A93AEFDE18000589DC (SCSI Disk Device Capacity: 36G) | | | |
| c4 50020f2300005f24 | yes | yes | ok |
| c5 50020f23000063a9 | yes | yes | ok |

Using the device centric and/or transport centric interfaces, a user may discover information about fabric devices accessible from a host and select devices for on-demand configuration including node creation. In one embodiment, for fabric topologies connected to the host system, operating system device nodes may not be created until an on-demand request is made by the administration application. Upon such a request from the administration application 502, the interface 503 and fabric driver 504 may provide a list of devices visible through one or more fabric host adapter ports according to a device centric or a transport centric perspective. The list of fabric devices may be provided by the administration application 502 to a user, for example, through a graphical user interface. The user may use the administration application 502 to select and online particular devices which are desired to be used by the host system. The user may use administration application 502 to select a device and request a device centric configuration through interface 503 such that the selected device may be brought online with associated multiple paths. In other embodiments, devices may be configured from a transport centric perspective such that a device is configured for a selected device path.

For direct attach devices, e.g. private loop topologies, operating system device nodes may be created during driver attach (e.g., when the fabric driver is loaded during a reboot) for all devices visible through a direct attach port. In some embodiments, operating system device nodes may only be created for direct attach devices that support a particular protocol (e.g., Fibre Channel Protocol (FCP)/SCSI).

The user may also use administration application 502 to offline any devices which are no longer needed. Offlining may include removing access to a storage device from the host operating system by removing the node. The list of devices displayed to the user by the administration application 502 may include the information returned about the fabric devices from a device centric or transport centric perspective. The administration application 502 may request the fabric driver 504 to online or offline fabric devices as indicated by a user using the application's user interface. The administration application 502 may request the fabric driver 504 to online or offline fabric devices from a device centric or transport centric perspective.

In some embodiments, the administration application 502 may make requests to the fabric driver to obtain fabric device information and/or to online/offline fabric devices without the involvement of a user. For example, certain events or requests from other processes may trigger the administration application 502 to online a fabric device(s).

The persistent repository 506 may be stored in the host system, or in some central locale accessible to the host system 508 indicating the current fabric devices which have been onlined (e.g., devices for which an operating system device node has been created). The persistent repository 506 may store fabric device configuration information from a device centric or a transport centric perspective as described above. The information stored in the persistent repository 506 may be used so that the configuration of devices online for the host system 508 persists across reboots and shutdowns. For example, when the host system 508 is rebooted the persistent repository may be read to determine which devices were online before the reboot and the fabric driver may be requested to online these same devices again.

The persistent repository 506 may be dynamically updated to reflect the state of the fabric devices. For example, if a fabric device which is currently online for the host system is disabled on the fabric (for example, a hard drive fails or is removed from the fabric), the fabric driver may generate an event causing the persistent repository 506 to be updated to reflect that the device or a particular path configuration for the device is now offline. Similarly, if the same device later is restored on the fabric, the device or a particular path configuration for the device may be onlined again (e.g., in response to an event) for the host system 508 and the persistent repository 506 may be dynamically updated to reflect the onlined status.

Figure 6:
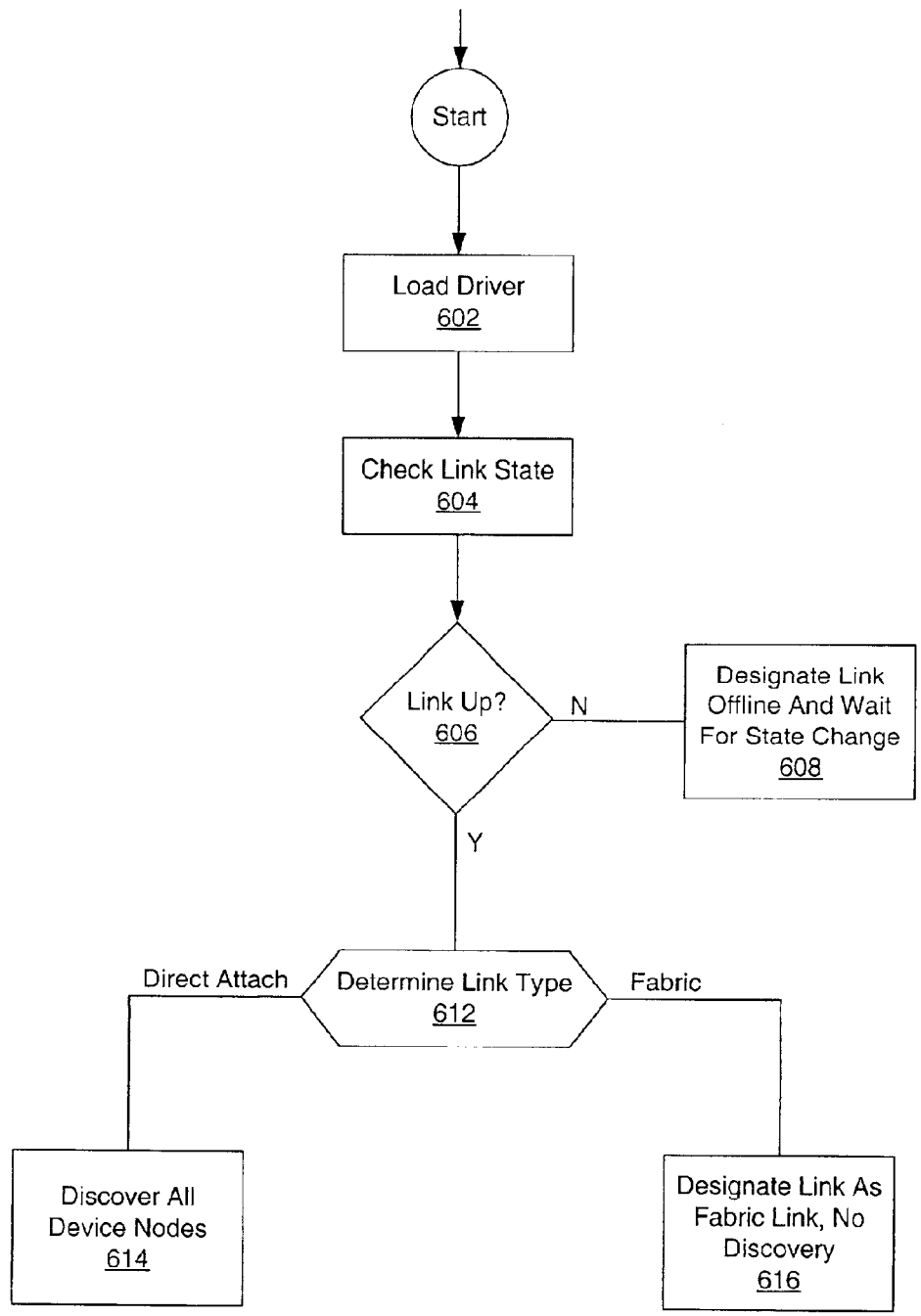
FIG. 6 is an example of a device discovery process according to an embodiment.

Turning to FIG. 6, a flowchart is provided illustrating a device discovery process according to one embodiment. The discovery process may be part of a host system reconfiguration boot process. Alternatively, if a non-reconfiguration boot is performed of the host system in which device discovery is not performed, the discovery process may run when a previously created device node is accessed in the host system. This discovery process may also be performed if the host system's host adapter link is lost (e.g., cable pulled out).

During the discovery process a fabric driver is loaded as indicated at 602. Note that if the fabric driver is already loaded, then it may not be necessary to load the fabric driver again. The link state of each host adapter port may be checked as indicated at 604 and 606. If a port's link is down, the link may be designated as offline as indicated at 608, and the discovery process for that link may wait for a state change in the link to online, as indicated at 610. If the link is later restored, the discovery process may continue for that link.

If the link is up, the link type is determined, as indicated at 612. In one embodiment, a fabric login is attempted through the link. If the fabric login is successful, the link is determined to be a fabric link. If unsuccessful the link is determined to be a direct attach link. For a direct attach link, one or more direct attach devices are discovered and brought online by creating operating system device nodes for each direct attach device. If the link is a fabric link, the link is designated as such, but no device discovery or onlining of devices is performed for the fabric link as part of this discovery process, as indicated at 616. This discovery process may be repeated any time a link goes out (e.g., cable pulled, power off, host reboot, etc.).

The device discovery process may provide for the discovery and onlining of direct attach devices since the discovery and onlining of such devices may be completed quickly due to the limited number of such devices. However, in some embodiments, for a host system's fabric links, device discovery may not be performed as part of the normal discovery process at reconfiguration boot up or the first time a node is attempted to be accessed after a link has been down and brought back up. Instead, fabric devices may be discovered using the on-demand node creation process described herein.

Figure 7:
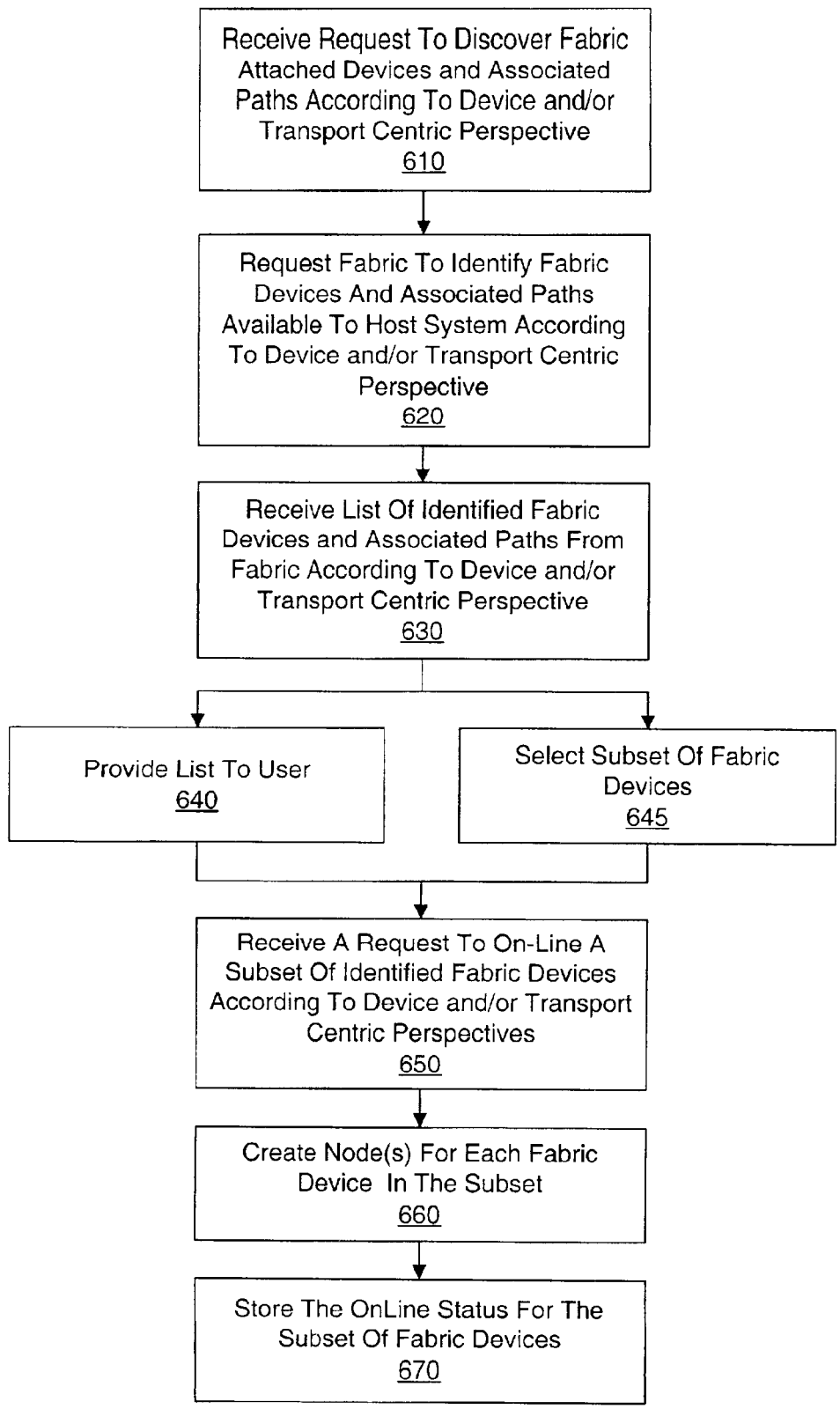
FIG. 7 is a flowchart of an on-demand device node creation process, according to one embodiment.

One embodiment of the on-demand node creation process is illustrated by the flowchart of FIG. 7. A request may be received to discover fabric attached devices and associated paths, as indicated at 610. The request may be a request to an interface to discover fabric devices from a device and/or transport centric perspective. In response to the request to discover fabric attached devices, a fabric may be requested to identify fabric devices and associated paths available to a host system, as indicated at 620. A list of identified fabric devices and associated paths may be received from the fabric, as indicated at 630. Note that the term "list" simply refers to the information or data provided by the fabric driver.

This list may be provided to a user for selection of a subset of the fabric devices, as indicated at 640. Discovery information may be returned in a device centric perspective such that multi-path devices are each presented as a single device with transport information shown for each path to the device. In one embodiment, device centric discovery may be presented by grouping path information together for each device so that each device is presented with all of its discovered paths. Discovery information may alternatively or additionally be returned in a transport centric perspective such that device transport information for each port is listed. In one embodiment, transport centric discovery may be presented by grouping device transport information together for each port so that each discovered device path from a host adapter port is presented together for the port. Alternatively, selection of a subset of the fabric devices may be performed without user involvement, as indicated at 645.

A request may be received to on-line the subset of identified fabric devices, as indicated at 650. In one embodiment, the user may select a device from a device centric view and request that the selected device be brought online for each path presented for the device. Thus, a user may select a device for device centric configuration to online the selected device for all of the paths presented for the device. In another embodiment, the user may select a device from a transport centric view and request that the selected device be brought online for the selected path. In response to the request to on-line the subset of identified fabric devices, a node or nodes may be created for each fabric device of the subset not already on-line, as indicated at 660. A node provides a mechanism for processes to communicate with the corresponding device from the host system. The on-line status on each fabric device of the subset may be stored, as indicated at 670.

Figure 8:
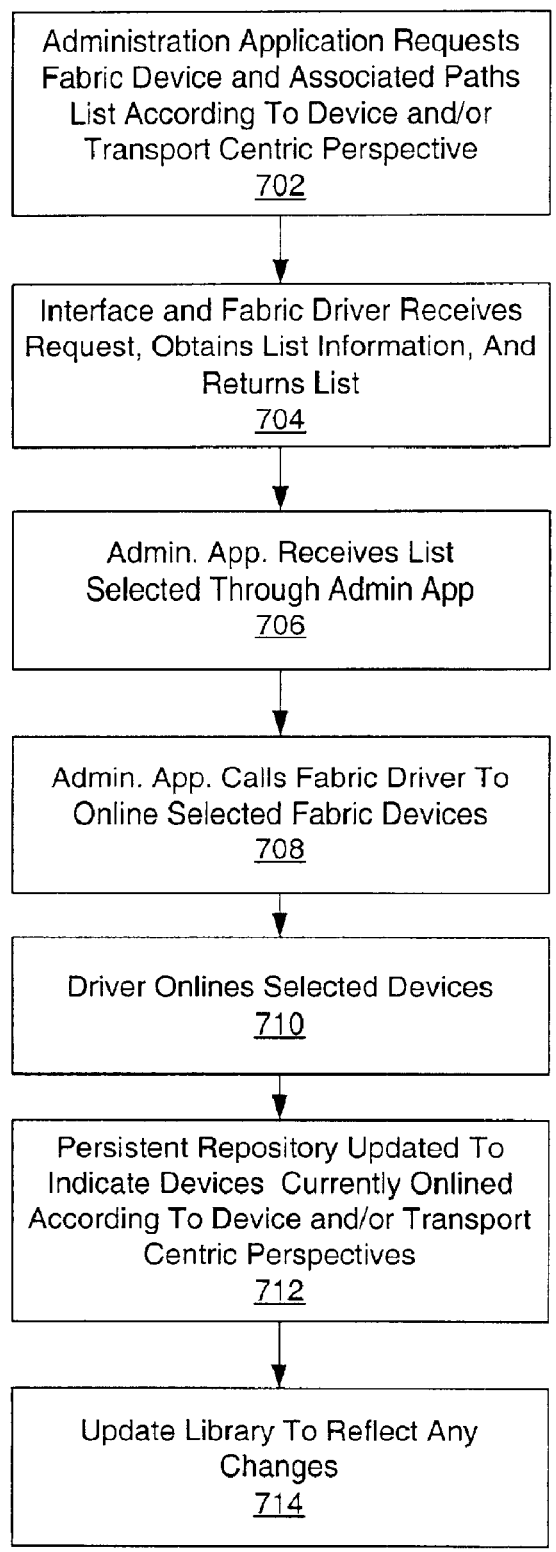
FIG. 8 is a flowchart of an on-demand node creation process for fibre channel fabrics according to an embodiment.

Another embodiment of the on-demand node creation process is illustrated by the flowchart of FIG. 8. An administration application may make a request for a list of fabric devices, as indicated at 702. This request may have been initiated by a user using the administration application for the host system. In other embodiments, this process may be initiated automatically, for example in response to an event (e.g., fibre channel protocol event) or a request from another application or process. The request may be made to a device centric or transport centric interface, as described above, to request fabric device information in a device centric or transport centric perspective. The device centric and/or transport centric interface may then request fabric device information from a fabric driver, as indicated at 704. The fabric driver may access a fabric name server to obtain the requested information and return the requested list of fabric devices to the administration application. Note that the term "list" simply refers to the information or data provided by the fabric driver, not any particular format.

The administration application may receive the list and a subset of devices may be selected from the list, as indicated at 706. If a device centric discovery request was made, discovery information may be returned in a device centric perspective such that multi-path devices are each presented as a single device with transport information shown for each path to the device. If a device centric discovery request was made, discovery information may be returned in a transport centric perspective such that device transport information is listed for each host adapter port. In one embodiment, the list may be displayed through a graphical user interface to a user. In other embodiments, a command line or textual user interface may be used. The user may select particular devices from the list to be onlined or offlined. The user may select a device in a device centric view such that each discovered path for the device is selected. In some embodiments, a user may select devices to be onlined for particular paths from a transport centric view. The administration application may then call the fabric driver to online or offline devices as indicated by the selections made for the subset from the list, as indicated at 708. The driver may then attempt to online the devices selected to be onlined (and may offline the devices selected to be offlined), as indicated at 710. Onlining a device may include the creation of an operating system device node for that device. The device node may provide a mechanism for processes to communicate with the corresponding device from the host system.

A persistent repository may be updated (or created if not already existing) to indicate which devices and associated paths are currently online including device centric and/or transport centric data, as indicated at 712. During operation, the persistent repository may be updated to reflect any changes in fabric devices. For example, if a device and/or associated path indicated by the persistent repository to be currently onlined is removed from the fabric, the persistent repository may be updated accordingly as indicated at 714. Changes in the fabric may be detected by an event generated in the fabric and communicated to the administration application (or library) by the fabric driver.

Figure 9:
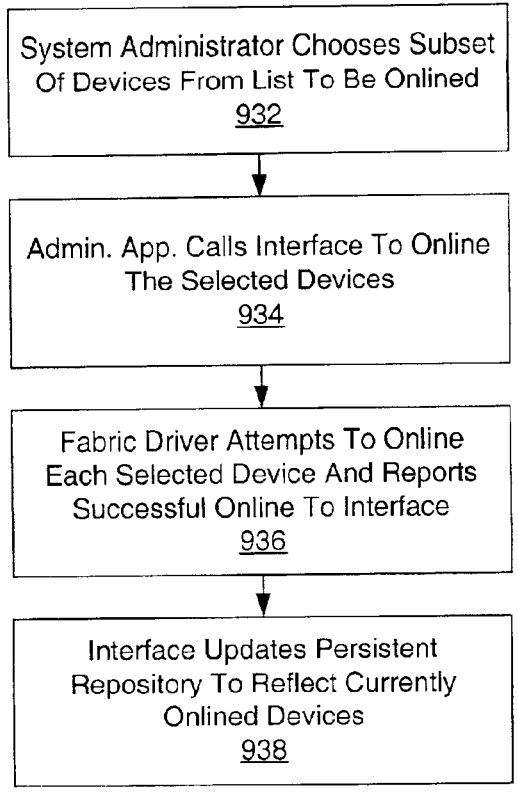
FIG. 9 is a flowchart showing a method for onlining selected fabric devices on-demand from a list of fabric devices according to one embodiment.

Turning to FIG. 9, a flowchart shows a method for onlining selected fabric devices on-demand from a list of fabric devices according to one embodiment. In one embodiment, a list of fabric devices may have been obtained by the method illustrated in FIG. 7 or 8. A user may choose a subset of devices from this list to online and pass this list of devices to the administration application, as indicated at 932. The administration application may then call an interface to the fabric driver to online the selected devices. For example, the administration application may call a fabric driver (via an interface) to online the selected devices, as indicated at 934. In one embodiment, the user may have selected a device from a device centric view and requested that the selected device be brought online with associated multiple paths. In further embodiments, the user may have selected a device from a transport centric view and requested that the selected device associated with the selected path be brought online. The fabric driver may attempt to online each of the selected devices in the list and report each successful online to the interface, as indicated at 936. For every device successfully onlined by the fabric driver, the administration application updates a persistent repository to reflect devices currently onlined, as indicated at 938. Note also that offlining a node through the administration application may cause an event to be generated to trigger an update the persistent repository.

Figure 10:
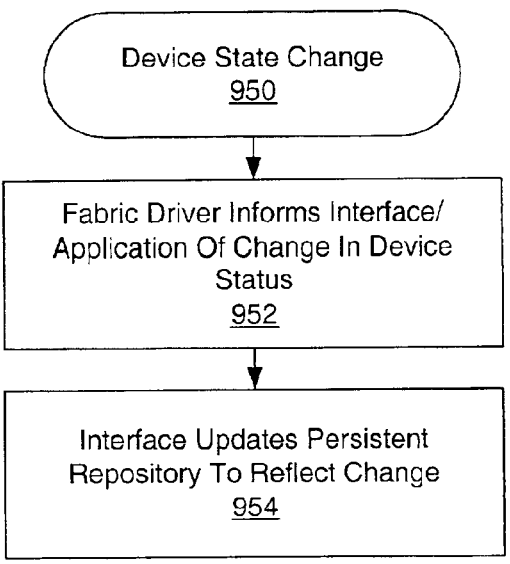
FIG. 10 is a flowchart illustrating a mechanism for dynamically updating a persistent repository to reflect changes in the fabric according to one embodiment.

Turning to FIG. 10, one embodiment is illustrated of a mechanism for dynamically updating the persistent repository to reflect changes that occur in the fabric. A device state change may occur in the fabric, as indicated at 950. For example, a fabric disk drive online for the host system may be removed from the fabric. An event may be generated to indicate this change. The fabric driver may inform the interface/application of such changes that affect the device list, as indicated at 952. The administration application may update the contents of the persistent repository in response to receiving notification of a change, as indicated at 954, so that the persistent repository is dynamically updated to reflect such changes. The persistent repository may be stored, for example, on persistent storage such as a disk drive or non-volatile memory.

Figure 11:
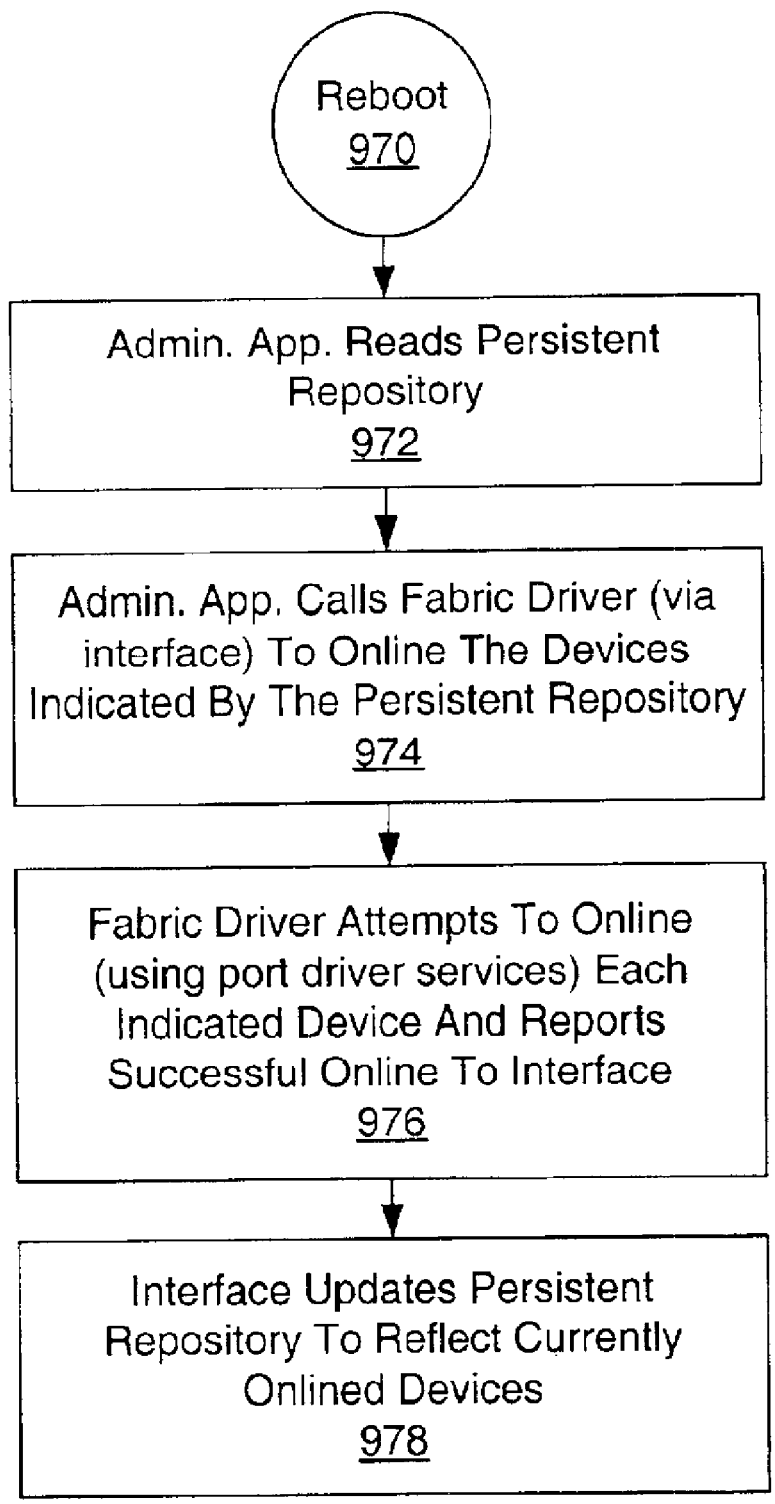
FIG. 11 is a flowchart illustrating a mechanism to allow a host's fabric device configuration to persist across reboots and shutdowns according to one embodiment.

The persistent repository may allow a host computer's fabric device configuration to persist across reboots and shutdowns as illustrated in FIG. 11 for one embodiment. On a host reboot (970), a component of administration application (e.g., in the Solaris 'rc' scripts) may read the persistent repository to determine which devices were previously online, as indicated at 972. The administration application then calls the fabric driver (via the interface) to online the fabric devices that were onlined prior to the reboot, as indicated at 974. The indicated at 976. The library may fabric driver attempts to online each device indicated by the persistent repository and reports successful onlines to through the interface to the application, as then update the persistent repository to reflect the currently online devices, as indicated at 978.

An example of an entry in a persistent repository is: /devices/pci@1f,4000/pci@2/SUNW,q1c@4/fp@0, 0:fc::50020f23000000e6. In this example, the entry identifies the /devices path to an onlined FC port. In other embodiments, additional information may be included. For example, the repository may identify onlined fabric devices on a per LUN basis. The persistent repository may store device configuration information in a device centric perspective, transport centric perspective, or both.

Note that the flow charts described herein represent exemplary embodiments of methods. The methods may be implemented in software, hardware, or a combination thereof. The order of method may be changed, and various elements may be added, reordered, combined, omitted, modified, etc. For example in FIG. 7, the persistent repository may store the online status (670) before, after or during creation of a node (660).

Various modifications and changes may be made as would be obvious to a person skilled in the art having the benefit of this disclosure. Note also that the flow charts described herein do not necessary require a temporal order. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
    one or more host adapter ports for coupling the system to a fabric network, wherein one or more devices attached to the fabric network are visible to the system through the one or more host adapter port;
    one or more processors configured to execute:
        a fabric driver configured to interface the system to the fabric network through the host adapter ports; and
        a device centric discovery interface configured to provide an interface to the fabric driver to obtain information about the devices in the fabric network, wherein the device centric discovery interface is configured to return device centric discovery information such that a multi-path fabric device is presented as a single device with transport information provided for each path to the multi-path device.

2. The system as recited in claim 1, wherein the processor is further configured to execute a device centric configuration interface configured to provide an interface to the fabric driver for device centric configuration of the devices in the fabric for use by the system such that a requested fabric device is configured for use by the system on multiple paths in the fabric network.

3. The system as recited in claim 2, wherein the processor is further configured to execute an application configured to request the device centric discovery interface to provide a list of fabric devices attached to the fabric that are visible to the system through one of the adapter ports;
    wherein the device centric discovery interface is further configured to provide a device centric presentation of fabric devices to the application in response to the request from the application;
    wherein the application is further configured to indicate to the device centric configuration interface a selected subset of the fabric devices from the presented fabric devices to be brought online for access from the host system; and
    wherein the device centric configuration interface is further configured to online through the fabric driver the selected subset of fabric devices so that each of the selected subset of fabric devices is accessible from the host system on all of its presented fabric paths.

4. The host system as recited in claim 3, wherein the application is further configured to:
    display the list of fabric devices to a user through a user interface in a device centric presentation such that each fabric device is shown grouped with its all its discovered fabric paths; and
    provide through the user interface for the user to select devices from the list as the selected subset of the fabric device to be brought online for all their respective fabric paths.

5. The system as recited in claim 2, wherein said in response to a request from the device centric configuration interface, the fabric driver is further configured to create device nodes within the host system for each requested fabric device, wherein each device node provides a mechanism for accessing a corresponding one of the subset of fabric devices through an operating system executing on the processor.

6. The system as recited in claim 1, wherein the processor is further configured to execute a transport centric discovery interface configured to provide an interface to the fabric driver to obtain information about the devices in the fabric network, wherein the transport centric discovery interface is configured to return transport centric discovery information such that a multi-path device is presented as a separate device for each path to the multi-path device.

7. The system as recited in claim 1, wherein the processor is further configured to execute a transport centric configuration interface configured to provide an interface to the fabric driver for transport centric configuration of the devices in the fabric for use by the system such that fabric device is configured for use by the system on a requested fabric transport path.

8. The system as recited in claim 1, wherein the one or more host adapter ports comprise a Fibre Channel host adapter port.

9. The system as recited in claim 1, wherein the device centric discovery interface is comprised within a library, wherein the library further comprises a persistent repository interface configured to update a persistent repository for each fabric device successfully brought online for the host system to indicate which devices are currently online.

10. The system as recited in claim 9, wherein the system is configured to, in response to a reboot of the host system:
    read the persistent repository; and
    request the fabric driver to online the devices indicated by the persistent repository to have been onlined prior to the reboot.

11. The system as recited in claim 1, wherein the fabric network comprises a Fibre Channel switched fabric comprising a plurality of Fibre Channel switches.

12. The system as recited in claim 1, wherein the fabric network is part of a storage area network (SAN), and wherein the fabric devices comprise storage devices.

13. A method, comprising:
    discovering a plurality of devices on a fabric network;
    displaying information describing the plurality of discovered devices in a device-centric format, wherein in the device-centric format each device is displayed as a single device with one or more associated paths each corresponding to a particular transport connection to a host, wherein at least one of the discovered devices is displayed in the device-centric format as a single device grouped with transport information for multiple different connections to the host; and
    configuring a selected one of the devices for use by the host on one or more associated paths in response to user input.

14. The method as recited in claim 13, wherein said configuring comprises a device centric configuration of the selected device in the fabric for use by the system such that the selected device is configured for use by the system on multiple paths in the fabric network during a particular configuration.

15. The method as recited in claim 13, wherein said configuring comprises creating a device node within the host for each associated path, wherein each device node provides a mechanism for accessing through an operating system executing on the host the corresponding fabric device on a particular associated path in the fabric network.

16. The method as recited in claim 13, further comprising displaying information describing the plurality of discovered devices in a transport-centric format, wherein in the transport-centric format a multi-path device is presented as a separate device for each path to the multi-path device.

17. The method as recited in claim 13, further comprising updating a persistent repository for each fabric device successfully configured for the host system to indicate which devices are currently online.

18. The method as recited in claim 17, further comprising, in response to a reboot of the host:
    reading the persistent repository; and
    configuring the devices indicated by the persistent repository to have been onlined prior to the reboot for use by the host.

19. The method as recited in claim 13, wherein the fabric network comprises a Fibre Channel switched fabric comprising a plurality of Fibre Channel switches.

20. The method as recited in claim 13, wherein the fabric network is part of a storage area network (SAN), and wherein the fabric devices comprise storage devices.

21. A storage area network comprising:
    a host system;
    a plurality of fabric devices coupled to the host system via a fabric network;
    wherein the host system is configured to:
        discover one or more of the plurality of fabric devices on the fabric network;
        display information describing the one or more discovered fabric devices in a device-centric format, wherein in the device-centric format each device is displayed as a single device with one or more associated paths each corresponding to a particular transport connection to the host system, wherein at least one of the fabric devices is displayed in the device-centric format as a single device grouped with transport information for multiple different connections to the host system; and
        configure on demand a selected one of the devices for use by the host on one or more associated paths in the fabric network.

22. A host system, comprising:
    one or more adapter ports for connecting to a fabric network;
    a fabric driver configured to interface the host system to the fabric network;
    wherein the host system is configured to:
        discover one or more of a plurality of devices coupled to the fabric network;
        display information describing the one or more discovered devices in a device-centric format, wherein in the device-centric format each device is displayed as a single device with one or more associated paths each corresponding to a particular adapter port of the host system, wherein at least one of the discovered devices is displayed in the device-centric format as a single device grouped with transport information for multiple different connections to the host system; and
        configure on demand a selected one of the devices for use by the host on one or more associated paths in the fabric network.

* * * * *